United States Patent [19]
Frame et al.

[11] Patent Number: 5,925,130
[45] Date of Patent: *Jul. 20, 1999

[54] COMPUTER POWER SWITCH INTERLOCK

[75] Inventors: Kenneth B. Frame, Spring; George Korinsky, Woodlands, both of Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/683,794

[22] Filed: Jul. 18, 1996

[51] Int. Cl.⁶ .................................................. G06F 3/00
[52] U.S. Cl. .................. 713/300; 713/321; 713/320; 713/324; 710/200
[58] Field of Search ..................... 395/750, 375, 395/182.12, 726, 750.01; 200/50, 43; 361/390, 147; 364/707

[56] References Cited

U.S. PATENT DOCUMENTS

| | | | |
|---|---|---|---|
| 3,882,291 | 5/1975 | Chiboroski | 200/50 A |
| 4,071,722 | 1/1978 | Hart | 200/50 |
| 4,355,269 | 10/1982 | Burton et al. | 318/436 |
| 4,638,129 | 1/1987 | Partus et al. | 200/43.22 |
| 4,668,878 | 5/1987 | Wyss | 307/141 |
| 4,885,436 | 12/1989 | Pham et al. | 200/50 A |
| 4,910,634 | 3/1990 | Pipkorn | 361/147 |
| 5,136,146 | 8/1992 | Anglin et al. | 235/441 |
| 5,198,627 | 3/1993 | Diaz et al. | 200/50 B |
| 5,502,689 | 3/1996 | Peterson et al. | 368/156 |
| 5,506,990 | 4/1996 | Holman, Jr. | 395/750 |
| 5,530,878 | 6/1996 | Bauer et al. | 395/750 |
| 5,638,261 | 6/1997 | Adams | 363/20 |
| 5,641,953 | 6/1997 | Fisher, Jr. | 200/50.12 |

*Primary Examiner*—Ayaz R. Sheikh
*Assistant Examiner*—Eric S. Thlang
*Attorney, Agent, or Firm*—Jenkens & Gilchrist

[57] ABSTRACT

The present invention supports computers or electronic devices that have a sleep, hibernation or low power mode. Because a device may appear to be off in low power mode, the present invention acts as an interlock to prevent or deter access to the device's electronics unless the power to the device has been disconnected or turned off.

6 Claims, 4 Drawing Sheets

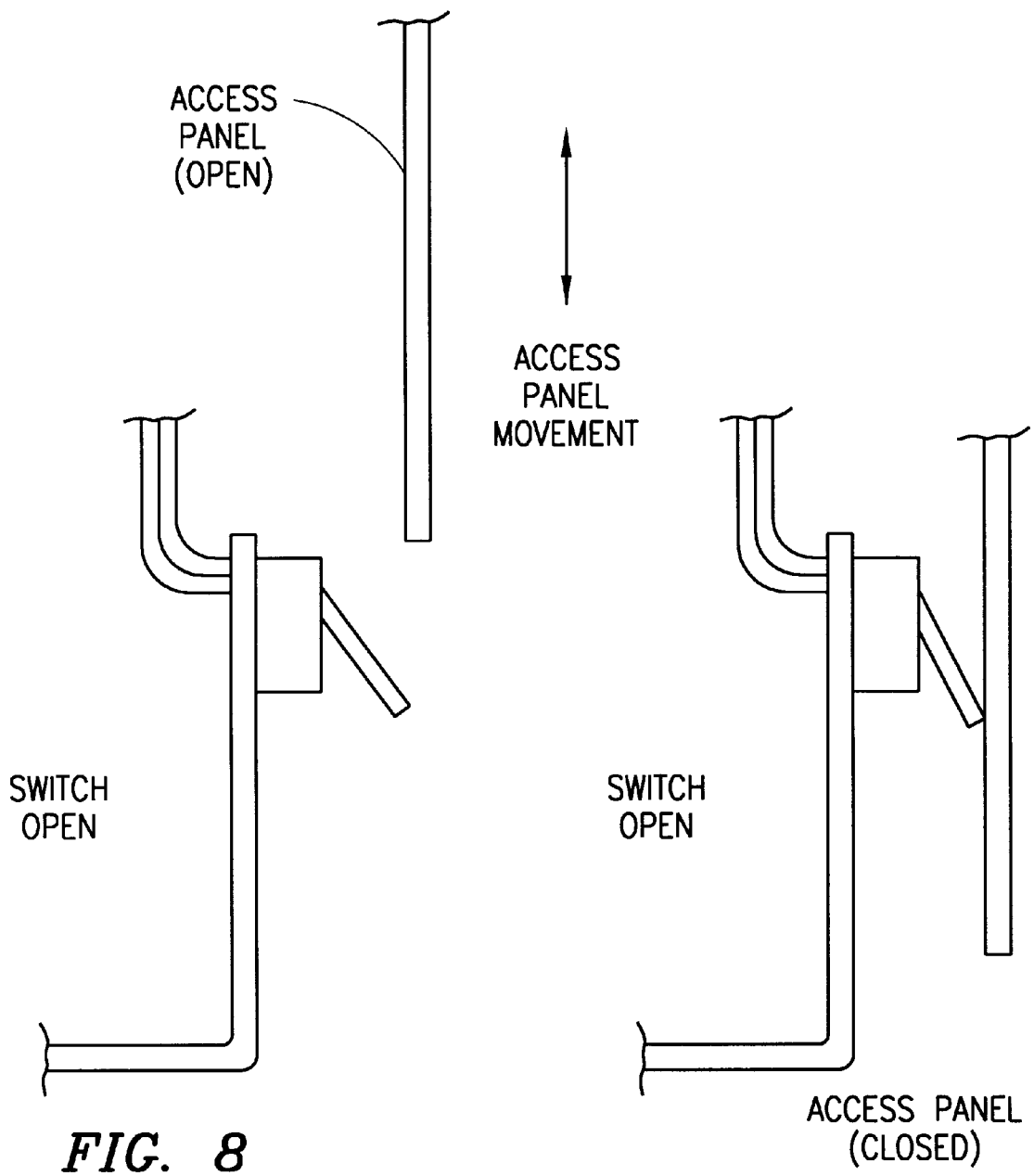

COMPUTER POWER SWITCH INTERLOCK

BACKGROUND OF THE INVENTION

1. Technical Field of the Invention

The present invention relates to a power switch interlock that will not allow a user to open an piece of electronic equipment until the main power switch to the piece of equipment is turned off and, in particular, to a device for a computer, computer terminal cabinet, or cover for an electronic device that will not allow a user to service the interior of the computer or electronic device until the main power to the computer or electronic device is switched to an off position.

2. Description of Related Art

A relatively new function of many personal computers is that they be can be placed in sleep or hibernation mode. The computers use very little energy in hibernation mode. In fact, it is almost impossible for the common user to know that the computer is not actually turned off, The display is turned off, all lights are turned off, the disc drives are off and the fan is off. The computer looks like it is off. Only a minimal amount of critical circuitry is on.

When a user touches a key or moves a predetermined part of the computer, the computer will come to life without having to be rebooted. This saves the user time and provides the appearance of an instant on computer.

A disadvantage of the hibernation mode is that the user may not realize that the computer is, in fact, on. A user may attempt to open the unit in order to perform service or to change out a circuit card. The user may proceed to pull and/or insert cards, processors, memory or other electronic devices while the power to critical circuitry is on and thereby damage components.

What is needed is a simple device to disable or deter a user from opening a computer while the computer is in a low power mode. Such a device can greatly decrease the chance of a user inadvertently damaging the electronics within a computer.

SUMMARY OF THE INVENTION

The present invention relates to a power interlock mechanism for a computer. The power interlock is built into or is part of a computer chassis. Within the computer chassis is computer circuitry that is capable of being placed in a sleep, hibernation, or very low power mode. A disconnectable power line plug or a power switch is provided. Access to the electronics within the computer chassis is allowed by way of a mechanism that is moved when the power switch is switched off or when the power line plug is removed from the power line plug socket.

The present invention may also include a mechanism associated with a panel that allows access to the electronics within a computer chassis. The mechanism includes a switch that moves to an off position when the access panel is removed from the computer. The switch is placed in an on position when the access panel is reinstalled thereby allowing power to the computer circuitry within the chassis.

It is an object of the present invention to provide protection from inadvertent opening of a computer chassis while the computer is in sleep or hibernation mode.

It is further an object of the present invention to provide a simple interlock mechanism associated with the main power to the computer that allows access to the electronics within a computer after power is turned off or disconnected from the computer.

It is a further object of the present invention to provide a means for making sure the power to the computer circuitry is on after access to the computer circuitry is provided to a user.

BRIEF DESCRIPTION OF THE DRAWINGS

A more complete understanding of the apparatus of the present invention may be had by reference to the following Detailed Description when taken in conjunction with the accompanying Drawings wherein:

FIG. 7 is a third embodiment of the power switch interlock in a closed position; and FIG. 8 is a third embodiment of the power switch interlock in an open position.

DETAILED DESCRIPTION OF A PRESENTLY PREFERRED EXEMPLARY EMBODIMENTS

The present invention relates to an on/off switch for a covered electronic device. The on/off switch has the additional function of an interlock for preventing access to the electronics within the electronic device unless the on/off switch is placed in the off position. This feature is useful, in particular, for computers that have a sleep mode. The interlock feature will not allow a user to open the computer cover unless the interlock switch is positioned in the off position. Another aspect of the present invention relates to an interlock switch that switches power to the electronics within a computer off when an access panel is removed.

Figure 1:
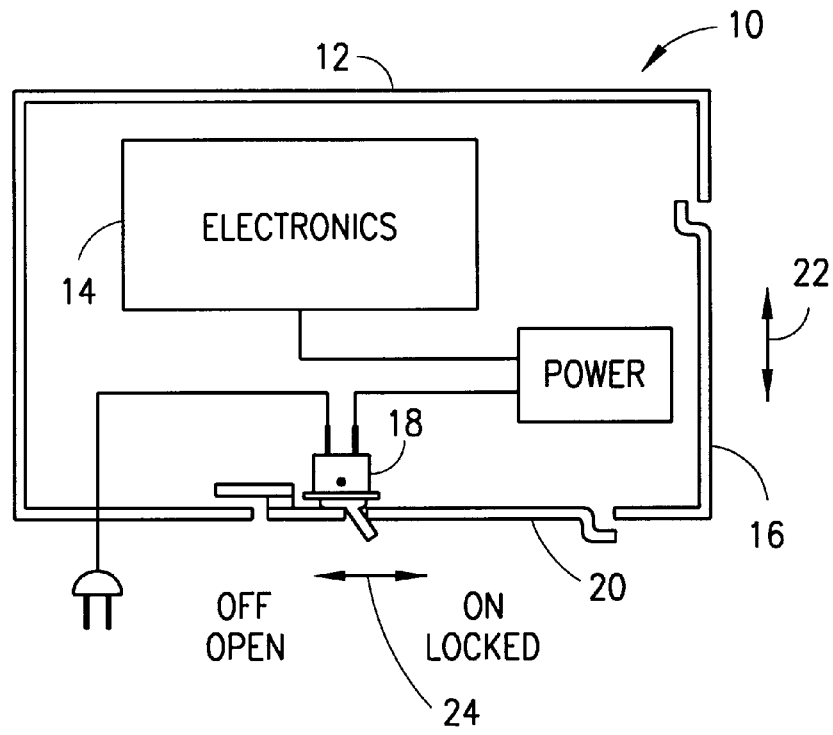
FIG. 1 is top view of a first embodiment of the power switch interlock.

FIG. 1, depicts a first embodiment of the power switch interlock 10 of the present invention. A computer chassis 12 surrounds the computer's electronics 14. An access panel 16, which allows access to the computer electronics, is part of the computer chassis 12. The access panel 16 can not be inadvertently removed while the computer is on. That is, a user may want to service the computer's electronics and not realize that the computer is in a sleep or a hibernation mode. The power switch interlock disables or deters a user from accessing the electronics within the computer chassis until the main power switch 18 is turned off.

In the first embodiment of the present power switch interlock apparatus, it is preferred that the power switch 18 be a rocker or toggle style switch. The rotational motion of a rocker or toggle style switch is transitioned into a horizontal translational motion by a mechanical linkage bar 20. The power switch 18 can be a variety of switches so long as they provide movement that either is or can be translated to mechanically lock or unlock an access cover. For example, a slide switch could be used instead of a toggle switch. To decrease design and manufacturing costs a standardized switch, such as a rocker or toggle style switch is preferred.

Figure 2:
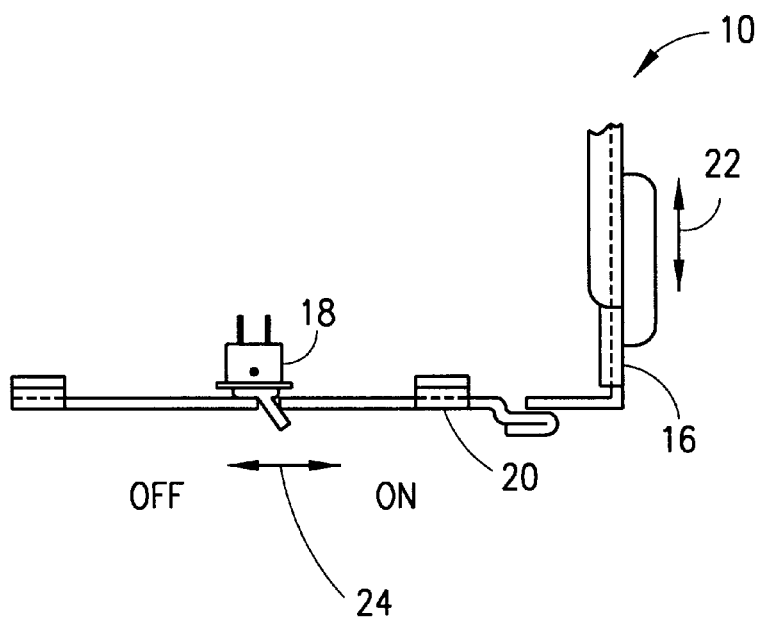
FIG. 2 is a drawing of the first embodiment of the power switch interlock in a closed position.

FIGS. 1 and 2 depict the linkage bar 20 in a position which holds the access cover 16 from being removed. FIG.

3 depicts the linkage bar 20 being moved to a position by the switch 18 so that the access panel 16 can be moved and removed. When the access panel 16 is moved access to the electronics 14 within the computer chassis 12 is possible. The movement arrows 22 depict the motion required to remove and replace the preferred access cover 16.

Figure 3:
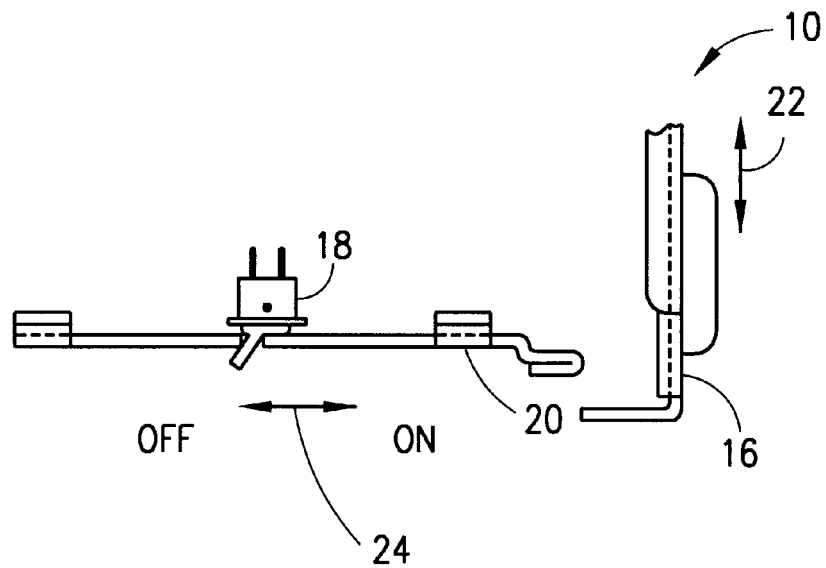
FIG. 3 is a drawing of the first embodiment of the power switch interlock in an open position.

Referring to FIGS. 2 and 3 the linkage bar 20 is captivated within the main chassis. In other words, the linkage bar is attached to the main chassis, but is free to slide in the horizontal direction depicted by the movement arrows 24. Movement of the linkage bar 20 is obtained when switch 18 is moved from on to off or off to on positions.

The access cover 16, when removed provides access to the electronics within the chassis 14. The access panel 16 could be of any size or shape so long as it is a part of the covering surrounding the electronics within the computer 14. It is important that the access panel 16 and the linkage bar 20 be manufactured out of materials that are durable and relatively nonbreakable so that a user does not break the material while attempting to gain entry to the computer's electronics 14. It is preferred that the computer chassis 12 near and around the interlocking mechanism be made of metal. Hard plastic or other similar materials could also be used.

When the power switch 18 is in the on position, the linkage bar 20 is positioned to overlap a portion of the access panel 16 so that the access panel 16 cannot be removed or opened. The linkage bar 20 could be placed so that it is inserted into a notch or slot associated with the access panel 16 such that access to the computer electronics 14 cannot be obtained by the user until the power switch 18 is placed into the off position.

If the linkage bar 20 is metal and the computer access panel 16 (and/or related parts are metal) probably at least a sixteenth ($1/16$) of an inch of overlap between the linkage bar 20 and the access panel 16 is large enough to stop a user from opening the access panel 16 without breaking or bending the metal. If plastic or polymer parts are used a larger overlap is necessary because of the potential for breakage and flexing of the part.

Again, the combination of the power switch 18 and the linkage bar 20 disallow a user from obtaining access to the sensitive electronics 14 within the computer chassis 12 until the power switch 18 is in the off position. When the power switch 18 is in the off position, the user is assured the computer is not in a sleep or hibernation mode. The user is assured that all power to the components within the chassis 14 are turned off.

It is understood that the power switch may be a main power switch and that a secondary power switch may be located elsewhere on the computer chassis so that the user can turn the computer off without having the access panel become loose on the computer chassis due to the interlock mechanism. In other words, there may be two power switches on the computer chassis of the present invention. One power switch allows access to the electronics within the computer chassis and turns off all power to the computer; and a second power switch that either shuts off all power to the computer or that allows the computer to go into or places the computer into a sleep or hibernation mode.

Figure 4:
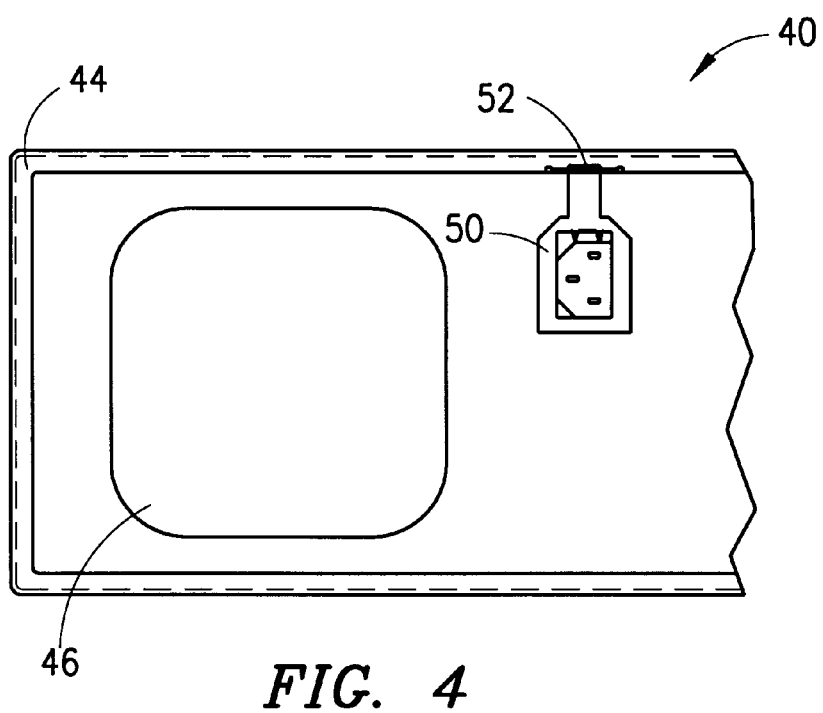
FIG. 4 is a side view of a second embodiment of the power switch interlock.
Figure 5:
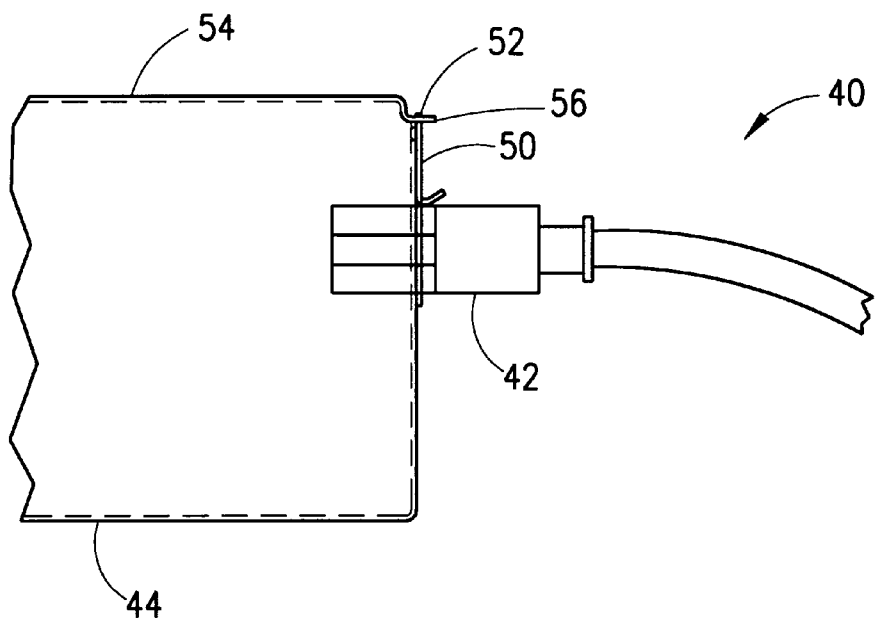
FIG. 5 is a top view of the second embodiment of the power switch interlock in a locked position.
Figure 6:
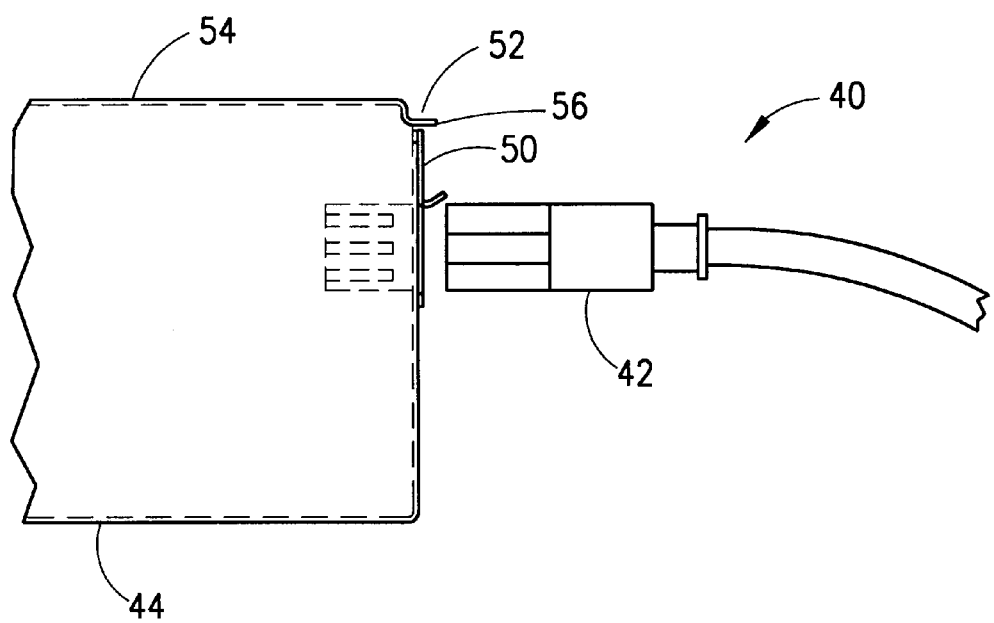
FIG. 6 is a top view of the second embodiment of the power switch interlock in an unlocked position.

A second embodiment of the present power lock 40 is depicted in FIGS. 4, 5, and 6. In the second embodiment, the line cord connection is incorporated into the power switch interlock. Access to the electronics within the computer chassis (not shown) is not readily possible unless the line cord 42 is disconnected from the computer chassis 44. This configuration, like the first embodiment, stops a user from accidentally gaining access to the electronics of the computer when the computer is in sleep or hibernation mode. As explained above, when the computer is in sleep or hibernation mode the computer, for all practical purposes, appears to be off even though critical components are still on. Once in sleep or hibernation mode the computer does not need to reboot when a user touches a key or raises the laptop computer display.

FIGS. 4, 5, and 6 depict views of a second exemplary power interlock in accordance with the present invention. The rear or side of an exemplary computer chassis 44 is depicted. A fan exhaust area 46 is shown. Next to the fan exhaust area 46 is the area where a power or line cord 42 is connected to the line cord socket 48. A linkage bar or hood latch bracket 50 has a small, preferably metal, tab 52. The access panel or hood 54 has a flange with a slit or hole 56 in it.

FIG. 5 shows a line cord 42 connected, to a line cord socket 48. When the line cord 42 is connected, the hood latch bracket 50 is slid toward the flange having the slit 56. The tab 52 of the hood latch bracket 50 is inserted into the slit thereby locking the hood or access panel into a closed position. Of course, when the line cord 42 is connected to the line cord socket 48, power can be provided to the electronics within the chassis 44.

It is understood that there is no requirement that the exemplary embodiment include a power switch to control power to the computer circuitry. Power can be provided to the computer circuitry when the line cord 42 is connected to the line cord socket 48, and at the same time the chassis 44 is locked. Again, the exemplary locking mechanism prevents a user from opening the chassis 44 or gaining access to the computer circuitry when power is connected to the circuitry (even though the computer appears to be completely powered down). Furthermore, it is understood that the exemplary embodiment is not the only mechanical configuration for providing power to the computer circuitry and locking the computer chassis closed simultaneously. For example, the locking mechanism means could comprise a line socket located such that a line plug is inserted through an overlapping cutout portion in an upper and lower portion of a computer chassis. Wherein when, the cutout portions are aligned and the line cord is inserted into the line socket the upper and lower chassis portions cannot be separated. Thus, preventing access to the circuitry when the line cord is inserted in the line socket.

FIG. 6 depicts the second exemplary power interlock 40 in an unlocked state. The tab 52 of the movable latch bracket 50 is not engaged with the slit of the flange 56 when the line cord 42 is unplugged. The latch bracket 50 may be biased by a spring or pulled by gravity into the unlatched state when the line cord 42 is removed from the line cord socket 48. Thus, power is not connected to the computer and it is okay to access and service the electronics within the computer chassis 44.

A third embodiment of the present power interlock is depicted in FIGS. 7 and 8. In the third embodiment, a spring loaded switch 47 or its equivalent is located inside the computer chassis 44. The spring loaded switch 47 is located in such a position that when the access cover 54 is removed from the computer chassis 44 the spring loaded switch 42 is released thereby eliminating power to the computer.

Note that the first and third embodiments incorporate switches that, after the access panel is removed and the computer is serviced, but before the access panel is replaced, can be "switched" to an on position to allow the user to test the servicing that was performed on the computer electronics prior to closing the access panel. The second embodiment can be designed to allow the line cord to be connected to the line cord socket with the access panel open. Thus, the present invention makes it difficult to gain access to the electronics of a computer without turning the power to the computer off, but allows power to be supplied to the electronics and the servicing to be tested after access is obtained.

As a review, the present exemplary embodiments support computers that are in a sleep or hibernation mode. The sleep or hibernation mode may be of the type supported by Microsoft Windows 95. A computer may not appear to be on when it is in sleep or hibernation mode. The lights, fans, hard drives, monitor, etc., will be powered down in the sleep or hibernation mode. Once in sleep or hibernation mode, the computer will "come alive", without having to reboot, at the touch of a button or the movement of a predetermined part of the computer.

The sleep or hibernation modes pose a problem for servicing the computer, because the computer needs to be turned off before servicing takes place. A user may mistake the computer as being off when it is in fact in hibernation. The present exemplary power interlock prevents access to the electronics within the computer chassis if power is still available to the computer electronics. The exemplary embodiments combine removing power from the electronics with a mechanical locking mechanism which allows access when the main power to the electronics is removed. One of the exemplary embodiments combines the mechanical locking mechanism with a switch. A second exemplary embodiment combines the mechanical locking system with the line plug socket; and a third exemplary embodiment combines the removal of an access panel with a switch that disconnects power to the computer electronics.

Although preferred embodiments of the present invention have been illustrated in the accompanying Drawings and have been described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A power interlock mechanism for a computer, comprising:

a computer chassis;

computer circuitry positioned inside said computer chassis, said computer circuitry being capable of being placed in a low power mode;

first means for turning off power to said computer circuitry and for allowing access to said computer circuitry when said power is removed from said computer circuitry, said first means further comprises a movable linkage having a locked position to prevent access to said computer circuitry and an unlocked position to allow access to said computer circuitry, said movable linkage being moved to said locked position when a power line is connected to said computer circuitry and said movable linkage being moved to an unlocked position when said power line is disconnected from said computer circuitry.

2. The power interlock mechanism of claim 1, wherein said first means includes a switch.

3. The power interlock mechanism of claim 2, wherein said switch is at least one of a toggle style, a rocker style and a sliding style switch.

4. The power interlock mechanism of claim 1, wherein said first means includes a mechanical linkage which is associated with both turning off power and allowing access to said computer circuitry.

5. The power interlock mechanism of claim 1, wherein said first means for turning off power and for allowing access operates such that when access to the computer circuitry begins to occur power to said computer circuitry is turned off.

6. A power interlock mechanism for a computer, comprising:

a computer chassis;

computer circuitry positioned inside said computer chassis, said computer circuitry being capable of being placed in a low power mode;

first means for turning off power to said computer circuitry and for allowing access to said computer circuitry when said power is removed from said computer circuitry; and an access panel, wherein a portion of said first means engages said access panel to prevent access to said computer circuitry when power to said computer circuitry is turned on.

* * * * *